US012555392B2

(12) United States Patent
Park et al.

(10) Patent No.: US 12,555,392 B2
(45) Date of Patent: Feb. 17, 2026

(54) APPARATUS FOR DETECTING OBJECT IN VEHICLE AND METHOD THEREOF

(71) Applicant: HL Klemove Corp., Incheon (KR)

(72) Inventors: Jang-Woong Park, Incheon (KR); Jeong Kim, Incheon (KR)

(73) Assignee: HL Klemove Corp., Incheon (KR)

( * ) Notice: Subject to any disclaimer, the term of this patent is extended or adjusted under 35 U.S.C. 154(b) by 301 days.

(21) Appl. No.: 18/217,919

(22) Filed: Jul. 3, 2023

(65) Prior Publication Data

US 2024/0185619 A1 Jun. 6, 2024

(30) Foreign Application Priority Data

Dec. 2, 2022 (KR) ........................ 10-2022-0166937

(51) Int. Cl.
*G06V 20/59* (2022.01)
*B60Q 9/00* (2006.01)
(Continued)

(52) U.S. Cl.
CPC ............. *G06V 20/593* (2022.01); *B60Q 9/00* (2013.01); *G01S 13/42* (2013.01); *G01S 13/58* (2013.01);
(Continued)

(58) Field of Classification Search
CPC ........ G06V 20/593; G06V 40/10; B60Q 9/00; B60Q 1/52; B60Q 5/005; G01S 13/42;
(Continued)

(56) References Cited

U.S. PATENT DOCUMENTS 9,227,484 B1 * 1/2016 Justice ................... B60N 2/274
11,292,342 B1 * 4/2022 Ignaczak .............. B60K 35/235
(Continued)

FOREIGN PATENT DOCUMENTS

JP 2006-159939 A 6/2006
KR 10-2019-0001029 A 1/2019
(Continued)

OTHER PUBLICATIONS

Office Action dated May 8, 2025 for corresponding Korean Patent Application No. 10-2022-0166937, along with an English machine translation (12 pages).

*Primary Examiner* — Jonathan A Boyd
(74) *Attorney, Agent, or Firm* — HAUPTMAN HAM, LLP

(57) ABSTRACT

Disclosed herein is an apparatus for rear seat detection. The apparatus including: an indoor camera having a field of view for a vehicle interior and providing image data; an indoor radar having a sensing area for the vehicle interior and providing radar data; and a controller including a first processor and a second processor, the first processor obtaining identification information on an object in a rear seat of a vehicle based on processing the image data, and a second processor obtaining motion information on the object in the rear seat of the vehicle based on processing the radar data. The controller determining whether the object in the rear seat of the vehicle is a human based on the identification information on the object in the rear seat of the vehicle and the motion information on the object when the vehicle is turned off and a door is locked, and outputting a warning notifying that there is a human in the rear seat of the vehicle based on determining that the object in the rear seat of the vehicle is the human.

20 Claims, 10 Drawing Sheets

(51) Int. Cl.
    *G01S 13/42*     (2006.01)
    *G01S 13/58*     (2006.01)
    *G06T 7/246*     (2017.01)
    *G06V 40/10*     (2022.01)

(52) U.S. Cl.
    CPC .............. *G06T 7/246* (2017.01); *G06V 40/10* (2022.01); *G06T 2207/10028* (2013.01); *G06T 2207/10044* (2013.01); *G06T 2207/30196* (2013.01); *G06T 2207/30268* (2013.01)

(58) Field of Classification Search
    CPC ........ G01S 13/58; G01S 7/415; G01S 13/931; G06T 7/246; G06T 2207/10028; G06T 2207/10044; G06T 2207/30196; G06T 2207/30268; B60R 21/01538; B60R 21/01534; B60R 21/01556; B60W 40/08; B60W 2040/0881; B60W 2540/221
    See application file for complete search history.

(56) References Cited

U.S. PATENT DOCUMENTS

| | | | |
|---|---|---|---|
| 2016/0379466 A1* | 12/2016 | Payant | B60N 2/267 340/457 |
| 2018/0218606 A1* | 8/2018 | Michalakis | G06V 10/225 |
| 2019/0057595 A1* | 2/2019 | Yamamoto | G08B 21/24 |
| 2020/0242917 A1* | 7/2020 | Ha | G08B 21/0222 |
| 2020/0327344 A1* | 10/2020 | Nakagawa | G06T 7/00 |
| 2021/0061301 A1* | 3/2021 | Denthumdas | B60N 2/0025 |
| 2022/0222949 A1* | 7/2022 | Lv | B60R 25/305 |
| 2022/0373646 A1* | 11/2022 | Nguyen | G01S 7/415 |
| 2022/0402429 A1* | 12/2022 | Takahashi | B60Q 3/80 |
| 2023/0021256 A1* | 1/2023 | Kang | G01S 13/584 |

FOREIGN PATENT DOCUMENTS

| | | |
|---|---|---|
| KR | 10-2021-0023556 A | 3/2021 |
| KR | 10-2228879 B1 | 3/2021 |
| KR | 10-2021-0070743 A | 6/2021 |

* cited by examiner

FIG. 9
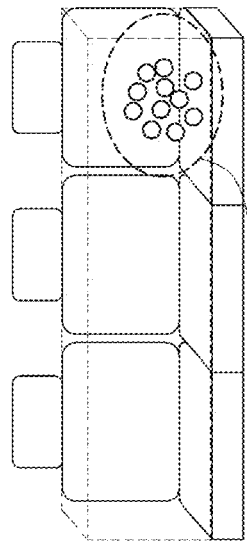
X, Y, AND Z COORDINATE INFORMATION OF EACH POINT
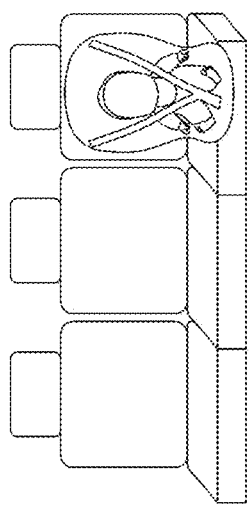

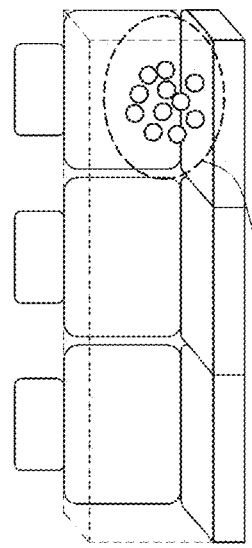
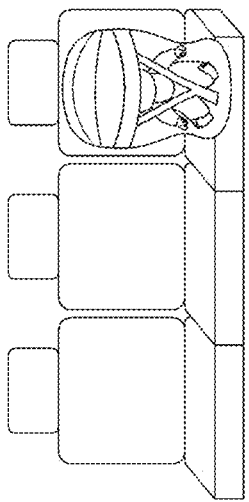
FIG. 10

APPARATUS FOR DETECTING OBJECT IN VEHICLE AND METHOD THEREOF

CROSS-REFERENCE TO RELATED APPLICATION

This application claims the benefit of Korean Patent Application No. 10-2022-0166937, filed on Dec. 2, 2022 in the Korean Intellectual Property Office, the disclosure of which is incorporated herein by reference.

TECHNICAL FIELD

Embodiments of the present disclosure relate to an apparatus for providing a rear occupant alert and a controlling method thereof.

BACKGROUND

A conventional alert for a rear occupant in a vehicle is a safety function for informing a driver or people near the vehicle that an infant or pet is left in a rear seat through a horn or emergency warning light. Provision of a rear occupant alert function can ensure the safety of an infant or pet that is left in a vehicle due to a driver's inattentiveness.

However, regarding a rear occupant alert, false detection may occur due to a movement similar to a movement of a human body such as a movement of water shaking in a bottle inside the vehicle or shaking of the vehicle due to external shocks such as winds even though the vehicle is stopped.

SUMMARY

Therefore, it is an aspect of the present disclosure to provide an apparatus for providing a rear occupant alert more accurately through an indoor camera and an indoor radar and a controlling method thereof.

Additional aspects of the disclosure will be set forth in part in the description which follows and, in part, will be obvious from the description, or may be learned by practice of the disclosure.

In accordance with one aspect of the present disclosure, an apparatus includes: an indoor camera having a field of view for a vehicle interior and configured provide image data; an indoor radar having a sensing area for the vehicle interior and configured to provide radar data; and a controller including a first processor and a second processor, the first processor configured to obtain identification information on an object in a rear seat of a vehicle based on processing the image data, and a second processor configured to obtain motion information on the object in the rear seat of the vehicle based on processing the radar data. The controller determines whether the object in the rear seat of the vehicle is a human based on the identification information on the object in the rear seat of the vehicle and the motion information on the object when the vehicle is turned off and a door is locked, and outputs a warning notifying that there is a human in the rear seat of the vehicle based on determining that the object in the rear seat of the vehicle is the human.

The controller may obtain motion information including a distance, a velocity, and an angle of arrival of the object based on performing digital signal processing on the radar data.

The controller may obtain a respiratory rate, a heart rate, and point cloud information of the object based on the motion information and determine whether the object is moving based on the obtained information.

The point cloud information may include x, y, and z coordinate information of points constituting the object.

The controller may obtain the identification information on the object including an object detection flag, a human detection flag, human age information, and a car seat detection flag by processing the image data for the object.

The controller may determine that a car seat is detected based on the car seat detection flag, and determine that a human is detected in a rear seat based on a cluster size of the motion information exceeding a predetermined value.

The controller may determine whether a human is detected based on the human detection flag when it is determined that no car seat is detected based on the car seat detection flag.

The first controller may determine whether an age of the human is smaller than a predetermined value based on the human age information when it is determined that the human is detected based on the human detection flag.

The first controller may determine that a human is detected in the rear seat based on the age of the human being smaller than the predetermined value and the cluster size of the motion information exceeding the predetermined value.

The first controller may output a warning notifying that a human is detected in the rear seat of the vehicle through a sound of a horn or by turning on a turn signal of the vehicle based on the object in the rear seat being the human.

In accordance with one aspect of the present disclosure, a method includes: obtaining image data by an indoor camera; obtaining radar data by an indoor radar; obtaining identification information on an object in a rear seat of a vehicle based on processing the image data by at least one processor; obtaining motion information on the object in the rear seat of the vehicle based on processing the radar data by the at least one processor; determining whether the object in the rear seat of the vehicle is a human based on the identification information on the object in the rear seat of the vehicle and the motion information on the object when the vehicle is turned off and a door is locked by the at least one processor; and outputting a warning notifying that a human is detected in the rear seat of the vehicle based on determining that the object in the rear seat of the vehicle is the human.

The obtaining of the motion information may include obtaining the motion information including a distance, a velocity, and an angle of arrival of the object based on performing digital signal processing on the radar data.

The obtaining of the motion information may include: obtaining a respiratory rate, a heart rate, and point cloud information of the object based on the motion information; and determining whether the object is moving based on the obtained information.

The point cloud information may include x, y, and z coordinate information of points constituting the object.

The obtaining of the identification information may include obtaining the identification information on the object including an object detection flag, a human detection flag, human age information, and a car seat detection flag by processing the image data for the object.

The determining of whether the object in the rear seat of the vehicle is a human may include: determining whether a car seat is detected based on the car seat detection flag; determining whether a cluster size of the motion information exceeds a predetermined value based on detection of the car seat being determined; and determining that a human is detected in the rear seat based on the cluster size exceeding the predetermined value.

The determining of whether the object in the rear seat of the vehicle is a human may include determining whether the human is detected based on the human detection flag when it is determined that no car seat is detected based on the car seat detection flag.

The determining of whether the object in the rear seat of the vehicle is a human may include determining whether an age of the human is smaller than a predetermined value based on the human age information when it is determined that the human is detected based on the human detection flag.

The determining of whether the object in the rear seat of the vehicle is a human may include determining that a human is detected in the rear seat based on the age of the human being smaller than the predetermined value and the cluster size of the motion information exceeding the predetermined value.

The outputting of the warning that there is a human in the rear seat of the vehicle may include outputting the warning notifying that a human is detected in the rear seat of the vehicle through a sound of a horn or by turning on a turn signal of the vehicle based on the object in the rear seat being the human.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 6-10 illustrate detection results according to types of objects in the rear seats in accordance with one embodiment.

DETAILED DESCRIPTION

Figure 1:
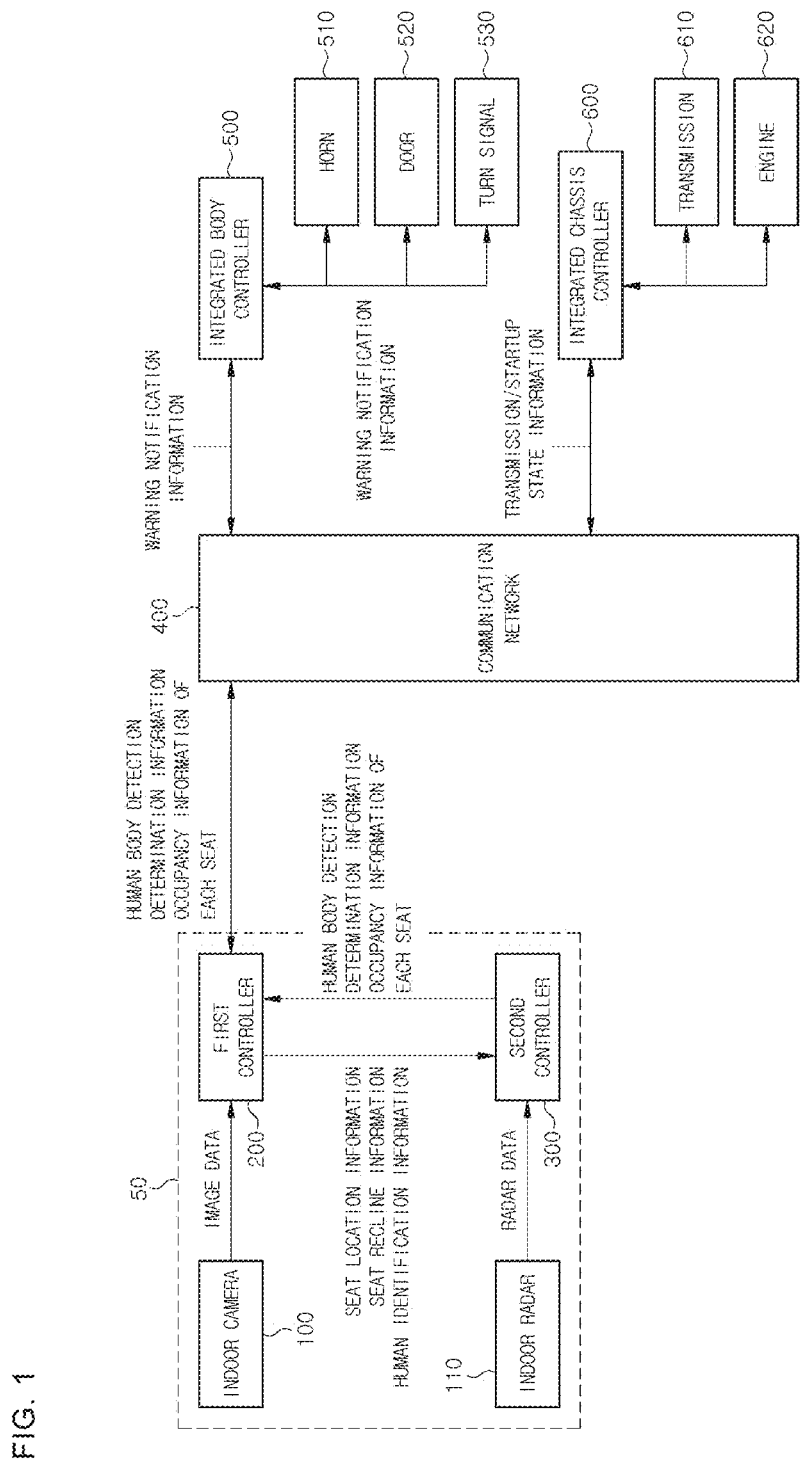
FIG. 1 illustrates a configuration of a rear seat detection device in accordance with one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
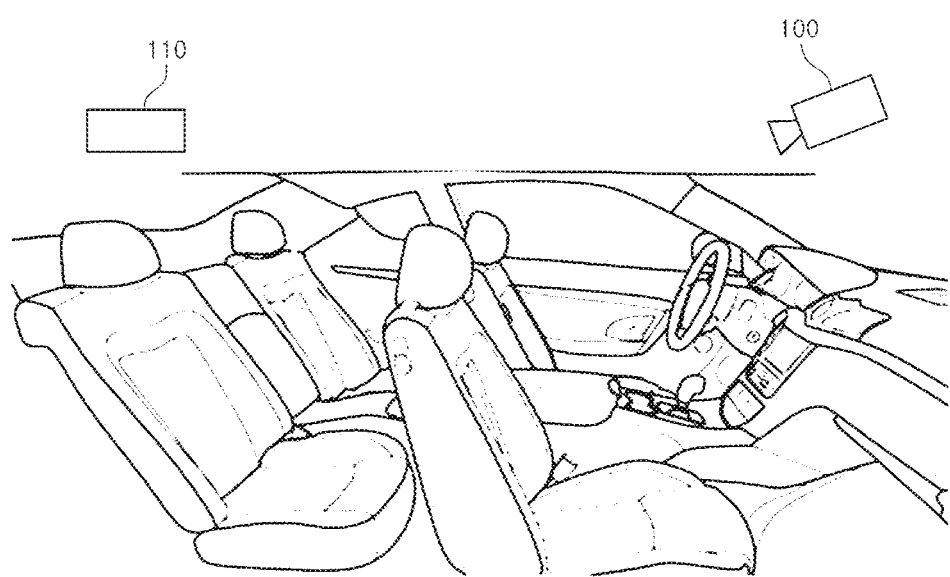
FIG. 2 illustrates locations where an indoor camera and an indoor radar are installed inside a vehicle in accordance with one embodiment.
Figure 3:
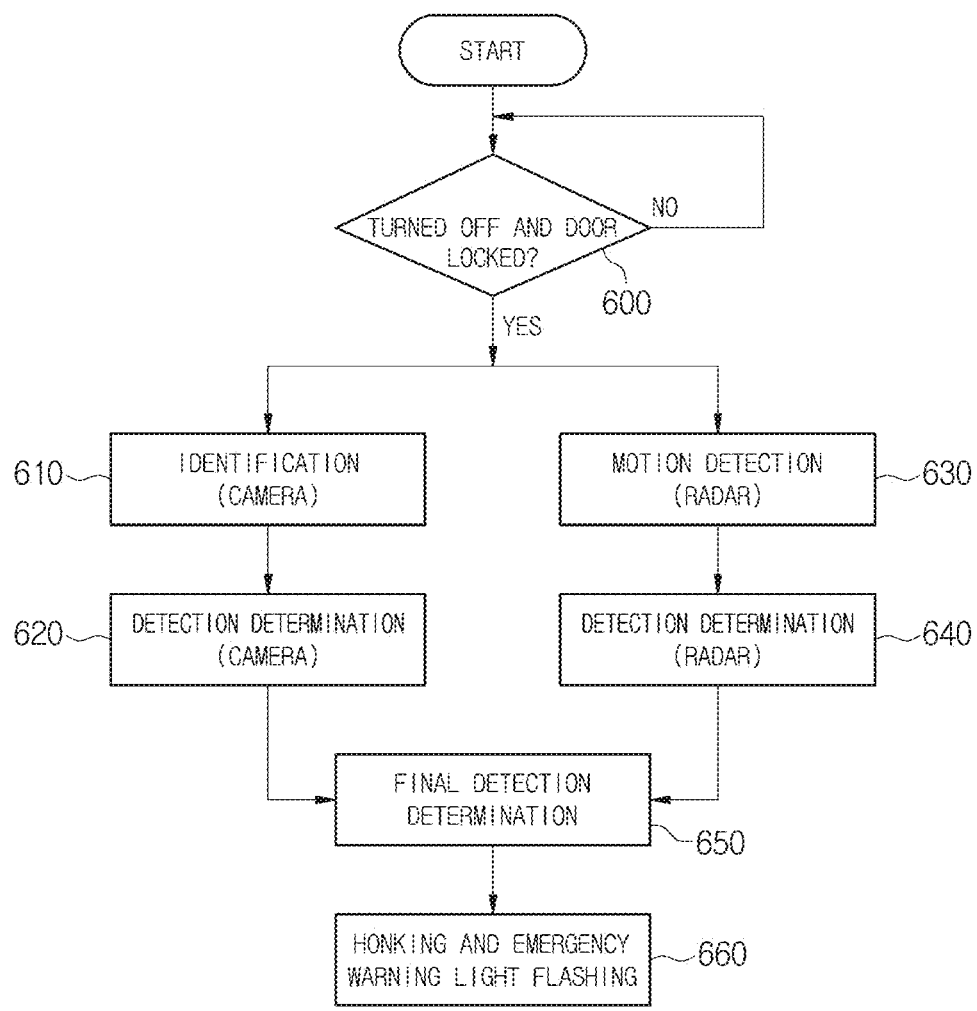
FIGS. 3 and 4 illustrate a method of detecting a rear seat in accordance with one embodiment.
Figure 4:
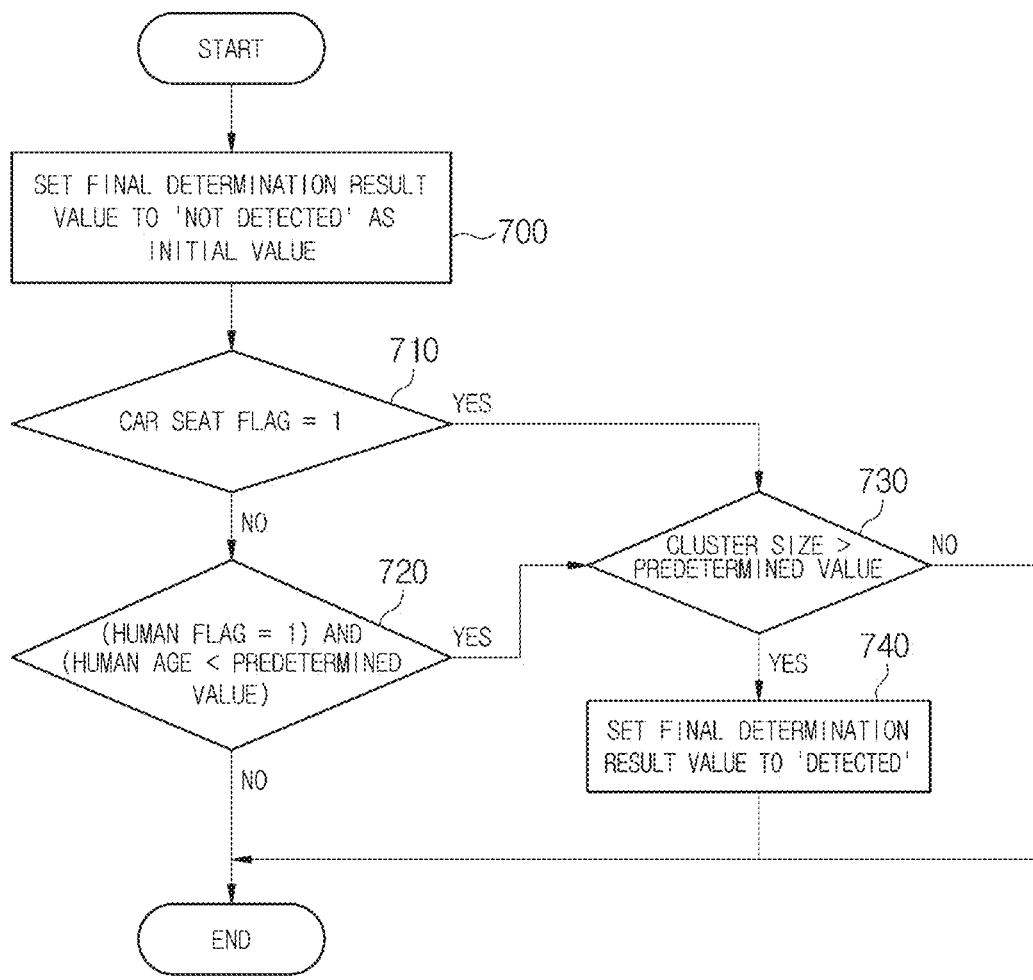
Figure 5:
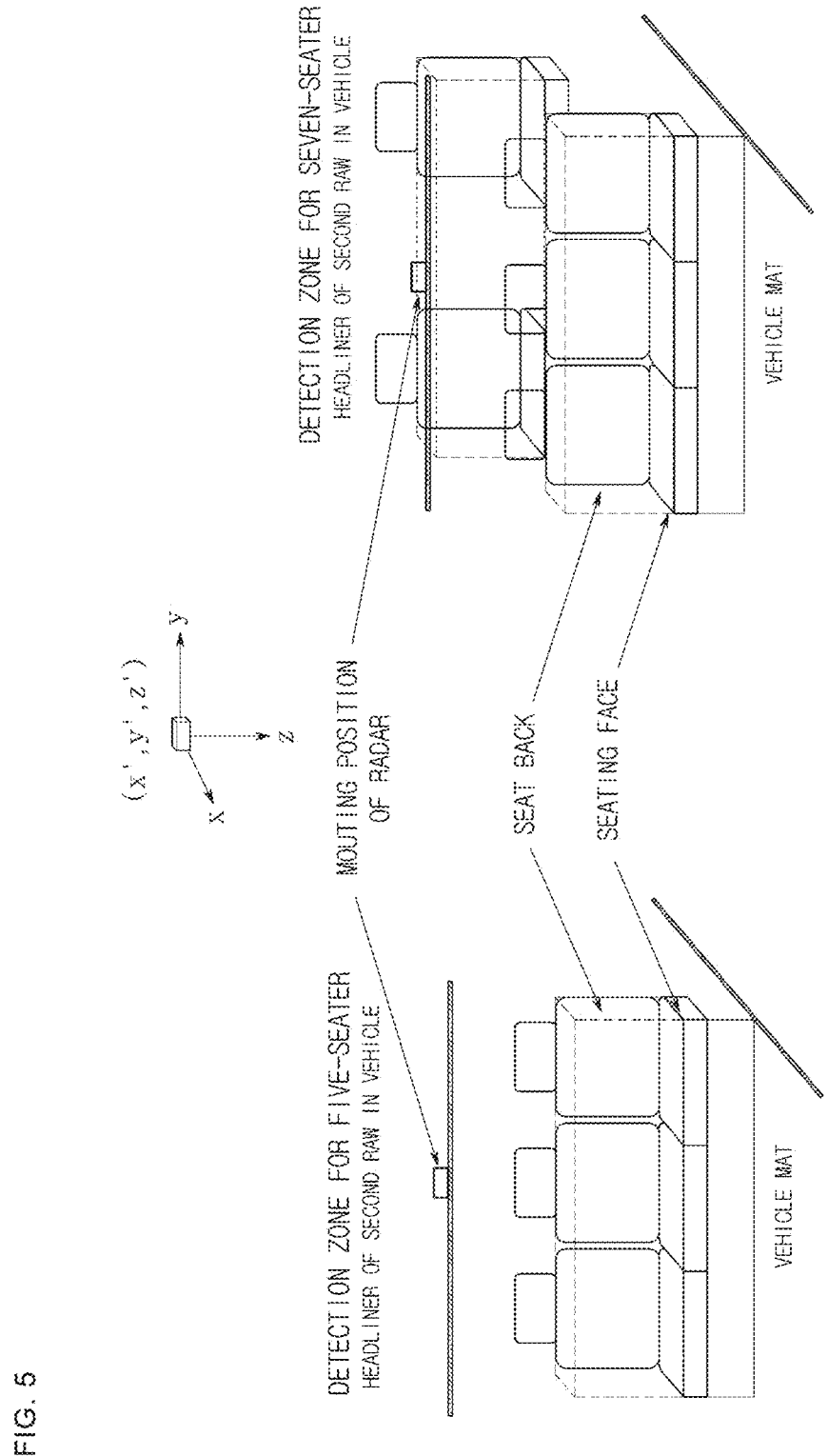
FIG. 5 illustrates a detection zone of the indoor radar in accordance with one embodiment.

FIG. 1 illustrates a configuration of a rear seat detection device in accordance with one embodiment. FIG. 2 illustrates locations where an indoor camera and an indoor radar are installed inside a vehicle in accordance with one embodiment. FIGS. 3 and 4 illustrate a method of detecting a rear seat in accordance with one embodiment. FIG. 5 illustrates a detection zone of the indoor radar. FIGS. 6 to 10 illustrate detection results according to types of objects in the rear seats.

As illustrated in FIG. 1, a vehicle may include a rear seat detection device 50, which includes an indoor camera 100, an indoor radar 110, a first controller 200, and a second controller 300, a vehicle communication network 400, an integrated body controller 500, a horn 510, a door 520, a turn signal 530, an integrated chassis controller 600, a transmission 610, and an engine 620. The horn 510, the door 520, and the turn signal 530 may output a warning according to rear seat occupant alert information transmitted from the first controller 200 under control of the integrated body controller 500. The transmission 610 and the engine 620 may transmit information regarding whether the vehicle is turned on and a transmission state of the transmission to the first controller 200 through the integrated chassis controller 600.

The rear seat detection device 50, the integrated body controller 500, and the integrated chassis controller 600 may communicate with each other via the vehicle communication network 400. For example, the rear seat detection device 50, the integrated body controller 500, and the integrated chassis controller 600 may send and receive data via Ethernet, MOST (Media Oriented Systems Transport), Flexray, CAN (Controller Area Network), LIN (Local Interconnect Network), and the like. The vehicle communication network 400 may be any wired or wireless communication network appropriate for sending and receiving data.

The rear seat detection device 50 may include the indoor camera 100, the indoor radar 110, the first controller 200, and the second controller 300. The first controller 200 may be an indoor camera controller, and the second controller 300 may be an indoor radar controller.

The indoor camera 100, the indoor radar 110, the first controller 200, and the second controller 300 may be provided separately from each other. For example, the first controller 200 may be installed in a housing that is separate from a housing of the indoor camera 100. The second controller 300 may be installed in a housing that is separate from a housing of the indoor radar 110. The first controller 200 and the second controller 300 may send and receive data to and from the indoor camera 100 or the indoor radar 110 via a broadband network. The first controller 200 and the second controller 300 may send and receive data to and from the indoor camera 100 or the indoor radar 110 via a wired and/or wireless network.

In addition, at least a part of the indoor camera 100, the indoor radar 110, the first controller 200, and the second controller 300 may be provided as one unit. For example, the indoor camera 100 and the first controller 200 may be provided in one housing, or the indoor radar 110 and the second controller 300 may be provided in one housing. In some embodiments, the indoor camera 100 and the first controller 200 may be provided in one housing and the indoor radar 110 and the second controller 300 may be provided in another housing. In some embodiments, the indoor camera 100, the first controller 200, the indoor radar 110 and the second controller 300 may be provided in one housing.

The indoor camera 100 may capture an interior of the vehicle and obtain image data of a driver. For example, as illustrated in FIG. 2, the indoor camera 100 may be installed in a rear view mirror or installed inside a front windshield and may have a field of view directed to the interior of the vehicle.

The indoor camera 100 may include a plurality of lenses and an image sensor. The image sensor may include a plurality of photodiodes that convert light into an electric signal, and the plurality of photodiodes may be placed in a two-dimensional matrix. The Image data may include information on an object in a rear seat inside the vehicle.

The rear seat detection device 50 may include an image processor 52 for processing image data of the indoor camera 100, and the image processor 52 may be integrally provided with, for example, the indoor camera 100 or the first controller 200.

The image processor 52 may obtain image data from the image sensor of the indoor camera 100 and obtain identification information of the object in the rear seat based on processing the image data.

The indoor radar 110 may send a transmission radio wave into the vehicle and obtain radar data associated with a motion of the object inside the vehicle based on a reflected radio wave reflected from the object in the rear seat. For example, as illustrated in FIG. 2, the indoor radar 110 may be installed in a headliner of a second row of the vehicle, and may have a sensing area directed to the interior of the vehicle.

The indoor radar 110 may include a transmission antenna (or transmission antenna array) emitting a transmission radio wave into the vehicle and a reception antenna (or reception antenna array) receiving a reflected radio wave reflected from the object.

The indoor radar 110 may obtain radar data from the transmission radio wave transmitted by the transmission antenna and the reflected radio wave received by the reception antenna. The radar data may include location information (for example, distance information) and/or speed information of the object in the rear seat inside the vehicle.

The rear seat detection device 50 may include a signal processor 54 for processing the radar data of the indoor radar 110, and the signal processor 54 may be integrally provided with, for example, the indoor radar 110 or the second controller 300.

The signal processor 54 may obtain radar data from the reception antenna of the indoor radar 110 and create data about a motion of the object by clustering reflection points of reflected signals. For example, the signal processor 54 may obtain a distance to the object based on a time difference between a transmission time of a transmission radio wave and a reception time of a reflected radio wave and obtain a velocity of the object based on a difference between a frequency of the transmission radio wave and a frequency of the reflected radio wave.

The signal processor 54 may deliver data about a motion of the object in the rear seat inside the vehicle obtained from the radar data to the second controller 300.

The first controller 200 may be electrically connected with the indoor camera 100, and the second controller 300 may be electrically connected with the indoor radar 110. In addition, the first controller 200 or the second controller 300 may be connected with the integrated body controller 500, the integrated chassis controller 600, and the like via a vehicle communication network.

The first controller 200 may process the image data of the indoor camera 100, and the second controller 300 may process the radar data of the indoor radar 110 and provide a control command to the integrated body controller 500.

Each of the first controller 200 and the second controller 300 may include a processor and a memory. The processor may have an associated non-transitory memory storing software instructions which, when executed by the processor, provides the functionalities of creating a control command for controlling the integrated body controller 500 and the integrated chassis controller 600 based on the processed data. The processor may take the form of one or more processor(s) and associated memory storing program instructions, and in some examples the one or more processor(s) may be used to implement the functions of both the first controller 200 and the second controller 300 and the processor associated with each.

The memory may store a program and/or data for processing image data and radar data. In addition, a control command for controlling the integrated body controller 500 may be stored.

The memory may temporarily memorize the image data received from the indoor camera 100 and the radar data received from the indoor radar 110, and temporarily memorize a processing result of the processor for the image data and the radar data.

The memory may include not only a volatile memory such as an S-RAM and a D-RAM but also a non-volatile memory such as a flash memory, a read only memory (ROM), and an erasable programmable read only memory (EPROM).

The processor may process the image data of the indoor camera 100 and the radar data of the indoor radar 110. For example, the processor may fuse the image data and the radar data and output fused data.

The processor may create a control command for controlling the integrated body controller 500 based on processing the fused data. For example, the processor may determine that there is an occupant in a rear seat, by processing detection information of an object obtained from the indoor camera 100 and the indoor radar 110. In addition, the processor may create a control command to enable the integrated body controller 500 to control the horn 510, the door 520, and the turn signal 530 and output a warning accordingly.

The processor may include an image processor 52 for processing the image data of the indoor camera 100, a signal processor 54 for processing the radar data of the indoor radar 110, or a micro control unit (MCU) for creating a control command for a control target.

As described above, the first controller 200 and the second controller 300 may provide control commands suitable for respective situations, where an occupant is in a rear seat, to the integrated body controller 500 based on the image data of the indoor camera 100 and the radar data of the indoor radar 110.

A concrete operation of the rear seat detection device 50 will be described in further detail below.

As for the problems of a rear occupant alert function, the movement of water shaking in a bottle in a rear seat or the shaking of the vehicle caused by external shocks such as winds may form a similar pattern to a breathing rate or heart rate of a human body, and a corresponding motion may also appear as point clouds. As a result, a system determines the motion as a motion of a human body and notifies a warning. That is, the warning notification due to false detection may cause inconvenience for a driver or people around a vehicle and induce people to avoid using the safety function.

The rear seat detection device 50 according to an embodiment of the present disclosure may significantly reduce the possibility of false detection by combining detection results of the indoor camera 100 and the indoor radar 110. A concrete operation will be described in further detail below.

Referring to FIG. 3, when a vehicle is turned off and the door 520 is locked (600), the first controller 200 identifies an object in a rear seat (610) and determines whether the object in the rear seat is a human (620). In addition, the second controller 300 detects a motion of the object in the rear seat (630) and determines whether the motion of the object in the rear seat is a motion of a human (640). The term human may be used throughout this disclosure, however it should be appreciated that human is intended to include animals (e.g., dogs and cats) that may be in a vehicle when the vehicle is turned off the door is locked.

When the vehicle is turned off and the door 520 is locked, the first controller 200 may process the image data obtained from the indoor camera 100 and obtain identification information on the object in the rear seat of the vehicle. For example, the first controller 200 may identify the presence of the object in the rear seat based on the image data obtained from the indoor camera 100, and may determine whether the object is a human, a non-human object like a bottle, or a car seat using a machine learning-based identification algorithm.

When the vehicle is turned off and the door 520 is locked, the second controller 300 may process the radar data obtained from the indoor radar 110 and obtain motion information on the object in the rear seat of the vehicle.

The second controller 300 may be a 60 GHz FMCW modulation type radar controller. The second controller 300 may perform digital signal processing (FFT+MVDR+ CFAR) on a digital sample delivered from ADC of the indoor radar 110.

The fast Fourier transform (FFT) may be used to analyze a signal in the frequency domain.

A minimum variance distortionless response (MVDR) is an algorithm that increases an SNR while minimizing output power of an array by maintaining a certain gain for a signal incident in a predetermined direction and giving a small weight (nulling) to a signal in another direction.

A constant false alarm rate (CFAR) algorithm is a method of setting a threshold value according to an ambient noise signal. Generally, in most signals received by the indoor radar 110, a noise signal occupies a larger region than a target signal in time-space domain. Accordingly, a target detection typically sets a threshold value and determines a signal above the threshold value as a target. However, in a real situation, since the signal intensity of noise changes over time, setting a constant threshold value increases the probability of mistakenly targeting a signal that is not a target. Accordingly, a CFAR algorithm, which sets a threshold value according to a surrounding noise signal, may be used.

Through the above-described digital signal processing, the second controller 300 may obtain motion information including information on a distance, a velocity, and an angle of arrival of the object in the rear seat.

The second controller 300 may determine whether the motion of the object is a motion of a human, by using the motion information of the object in the rear seat. For example, the second controller 300 may determine whether the motion of the object is a motion of a human such as breathing and heart beats, by using the information on the distance, the velocity, and the angle of arrival, which is included in the motion information of the object, and a point cloud.

Referring to FIG. 5, a region detected by the indoor radar 110 may be set differently according to a specification of a vehicle (the number of rear seats, an overall height, an overall width, etc). The detection region has a cuboid form, and coordinate information of each vertex of the cuboid is a parameter that may be set in a radar controller manufacturing operation. A coordinate value of each vertex is set based on a vehicle center point, a base of the cuboid may be set to a seating face, and a height may be set to a seat back height. A region detected by the indoor camera 100 may be the same region as the region detected by the indoor radar 110.

The identification information on the object in the rear seat, which is obtained by processing the image data of the indoor camera 100 in the first controller 200, may include an object detection flag, a human detection flag, human age information, and a car seat detection flag.

As a result of identifying the object in the rear seat, when the object detected in the rear seat is identified as a thing such as a water bottle, the first controller 200 may set the object detection flag to 1 and, when there is no detected object, the first controller 200 may set the object detection flag to 0.

As a result of identifying the object in the rear seat, when the object detected in the rear seat is identified as a human, the first controller 200 may set the human detection flag to 1 and, when there is no detected object, the first controller 200 may set the human detection flag to 0.

As a result of identifying the object in the rear seat, when the object detected in the rear seat is identified as a human, the first controller 200 may predict an age of the identified human and record the predicted age in the human age information.

As a result of identifying the object in the rear seat, when the object detected in the rear seat is identified as a car seat, the first controller 200 may set the car seat detection flag to 1 and, when there is no detected object, the first controller 200 may set the car seat detection flag to 0.

The motion information of the object obtained by processing the radar data in the second controller 300 may include point cloud information consisting of x, y, and z coordinate information of the detected object and may be transmitted to the first controller 200 in the following data format.

| [Data format] | | | | | | | | |
|---|---|---|---|---|---|---|---|---|
| Number of points (targets) | First point ID | x-axis coordinate of first point | y-axis coordinate of first point | z-axis coordinate of first point | ... | N-th point ID | x-axis coordinate of N-th point | y-axis coordinate of N-th point | z-axis coordinate of N-th point |

Figure 6:
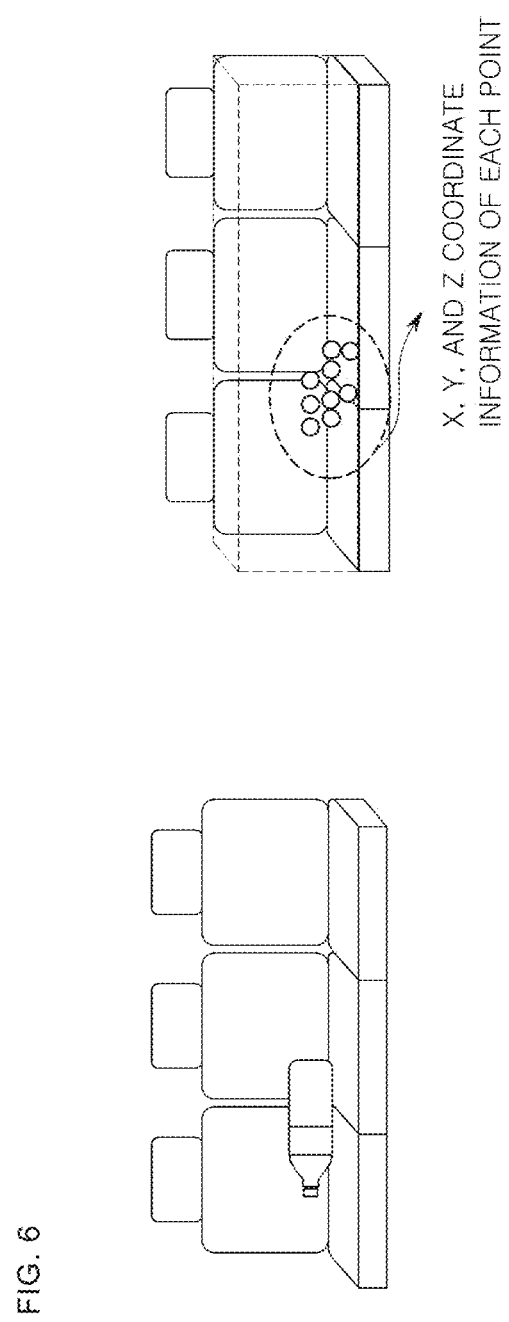

When there is a water bottle in the rear seat, the point cloud information obtained by processing the radar data about the object in the rear seat in the second controller 300 may consist of x, y, and z coordinate information of each point illustrated in FIG. 6. In addition, the identification information of the object in the rear seat determined by the first controller 200 is as follows.
 Object detection flag—1
 Human detection flag—0
 Human age information—0
 Car seat detection flag—0

Based on the identification information, the first controller 200 may determine that there is an object other than a human in the rear seat, and based on the point cloud information, the second controller 300 may determine that the motion of the object is not a human motion.

Figure 7:
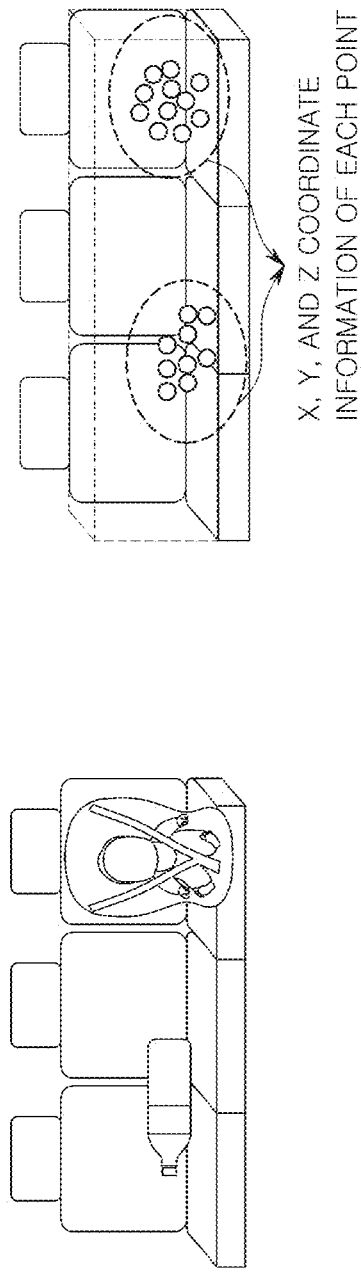

When there are a water bottle and a baby in the rear seat, the point cloud information obtained by processing the radar data about the objects in the rear seat in the second controller 300 may consist of x, y, and z coordinate information of each point illustrated in FIG. 7. In addition, the identification information of the objects in the rear seat determined by the first controller 200 is as follows.
 Object detection flag—1
 Human detection flag—1
 Human age information—2
 Car seat detection flag—1

Based on the identification information, the first controller 200 may determine that there are a baby and a thing in the rear seat, and based on the point cloud information, the second controller 300 may determine that the motions of the objects are a motion of a baby and a motion of a thing different from the baby.

Figure 8:
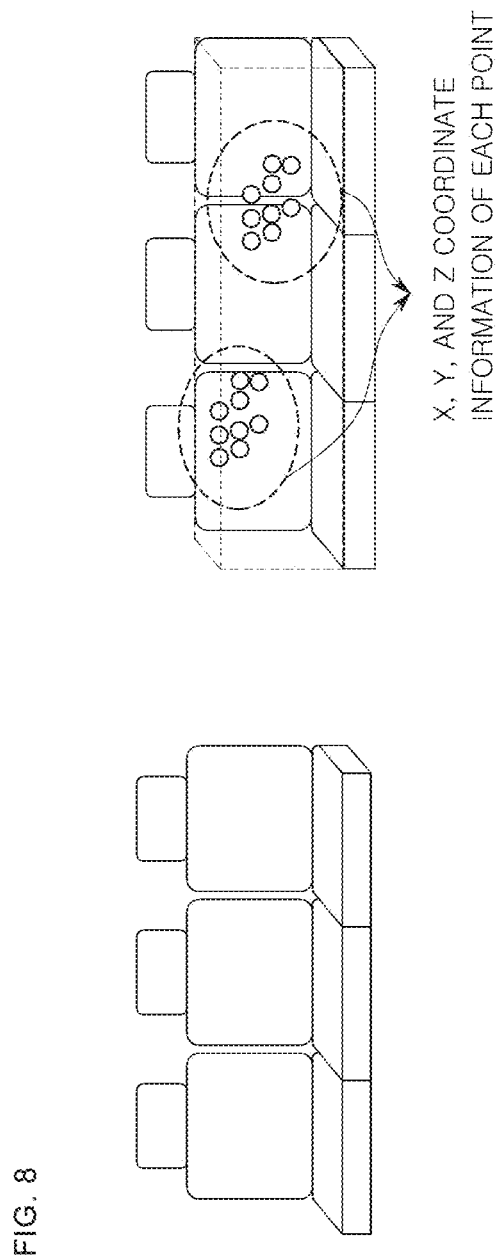

When there is no object in the rear seat and a shake exists due to an external force like wind, the point cloud information obtained by processing the radar data about the object in the rear seat in the second controller 300 may consist of x, y, and z coordinate information of each point illustrated in FIG. 8. In addition, the identification information of the object in the rear seat determined by the first controller 200 is as follows.
 Object detection flag—0
 Human detection flag—0
 Human age information—0
 Car seat detection flag—0

Based on the identification information, the first controller 200 may determine that there is no object in the rear seat, and based on the point cloud information, the second controller 300 may determine that the motion of the object is not a motion of a human or thing.

When there is only a baby in the rear seat, the point cloud information obtained by processing the radar data about the object in the rear seat in the second controller 300 may consist of x, y, and z coordinate information of each point illustrated in FIG. 9. In addition, the identification information of the object in the rear seat determined by the first controller 200 is as follows.
 Object detection flag—0
 Human detection flag—1
 Human age information—2
 Car seat detection flag—1

Based on the identification information, the first controller 200 may determine that there is only a baby in the rear seat, and based on the point cloud information, the second controller 300 may determine that the motion of the object is a motion of a baby.

When there is a car seat installed facing rearward or installed facing forward with a sunshade down in the rear seat, the point cloud information obtained by processing the radar data about the object in the rear seat in the second controller 300 may consist of x, y, and z coordinate information of each point illustrated in FIG. 10. In addition, the identification information of the object in the rear seat determined by the first controller 200 is as follows.
 Object detection flag—0
 Human detection flag—0
 Human age information—0
 Car seat detection flag—1

With the sunshade down, the first controller 200 cannot determine whether the object is a human or a thing but can detect the car seat, and based on the point cloud information, the second controller 300 may determine that the motion of the objects is a motion of a baby.

Referring to FIG. 3 again, by applying the process of determining a priority order illustrated in FIG. 4 to a determination result of the first controller 200 and a determination result of the second controller 300, the first controller 200 finally determines that a motion of an object determined as a human is detected in the rear seat (650). When the motion of the object in the rear seat is finally determined as a human motion, honking and emergency warning lights flashing are performed for a predetermined time to alert a driver or people near the vehicle of the dangerous situation (660).

Referring to FIG. 4, the first controller 200 sets a final determination result value to "not detected" as an initial value (700). When the car seat flag of identification information of the first controller 200 is 1 (710) and a cluster size of motion information of the second controller 300 is greater than a predetermined value (730), the first controller 200 sets the final determination result value to "detected" (740). That is, the first controller 200 may finally determine that a motion of an object determined as a human is detected in the rear seat.

When the car seat flag of identification information of the first controller 200 is not 1 (710), the human flag is 1, and the human age information is less than a predetermined value (720), the first controller 200 compares a cluster size of motion information of the second controller 300 with a predetermined value (730). When the cluster size is greater than the predetermined value, the final determination result value is set to "detected" (740). That is, the first controller 200 may finally determine that a motion of an object determined as a human is detected in the rear seat.

The predetermined value in operation 720, which is a comparison criterion for the human age information, is a parameter that can be modified through a service center or wireless update in response to regulatory changes even after a product is manufactured, and an update capacity may be reduced by providing the predetermined value as a separate data set, not a fixed value in software code.

In a product development process, the detection performance of a radar controller may become different depending on an environmental characteristic of each vehicle equipped with the radar controller. Accordingly, the predetermined value in operation S730, which is a comparison criterion for the cluster size, is a parameter that can be modified in a performance tuning operation, and performance tuning may become easier by providing the predetermined value as a separate data set, not a fixed value in software code.

As is apparent from the above description, the rear seat detection device 50 according to an embodiment of the present disclosure may be recognized as a reliable safety function by consumers by significantly lowering a false detection rate of rear occupant alert, and consequently reduce a possibility of a safety accident due to unintended neglect of an infant or pet. In addition, the cost of using a high-performance single controller may be lowered by distributed operation between the first controller 200 that is an indoor camera controller and the second controller 300 that is an indoor radar controller.

In accordance with one aspect of the present disclosure, it is possible to provide an apparatus for providing a rear occupant alert more accurately through an indoor camera and an indoor radar and a controlling method thereof.

Thus, the apparatus can be recognized as a reliable safety function by consumers by significantly lowering a false detection rate of a rear occupant alert and consequently reduce a possibility of a safety accident due to unintended neglect of an infant or pet.

In addition, a distributed operation between a camera controller and a radar controller can mitigate a cost increase that may occur when using a high-performance single controller.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for detecting an object in a vehicle, the object detection apparatus comprising:
   an indoor camera having a field of view for a vehicle interior and configured to provide image data;
   an indoor radar having a sensing area for the vehicle interior and configured to provide radar data; and
   a controller including a first processor and a second processor, the first processor configured to process the image data to obtain identification information on the object in a rear seat of the vehicle, and the second processor configured to process the radar data to obtain motion information on the object in the rear seat of the vehicle,
   wherein the controller is configured to:
      determine whether the object in the rear seat of the vehicle is a human based on the identification information on the object in the rear seat of the vehicle and the motion information on the object when the vehicle is turned off and a door is locked;
      obtain the identification information on the object including an object detection flag, a human detection flag, human age information, and a car seat detection flag by processing the image data for the object;
      when determining that a car seat is detected based on the car seat detection flag being set to one, the object detection flag being set to zero, and the human detection flag being set to zero, determine that the motion of the objects corresponds to a motion of a baby based on the motion information; and
      output a warning notifying that a human is detected in the rear seat of the vehicle based on determining that the object in the rear seat of the vehicle is the human.

2. The object detection apparatus of claim 1, wherein the controller is configured to obtain the motion information including a distance, a velocity, and an angle of arrival of the object based on performing digital signal processing on the radar data.

3. The object detection apparatus of claim 1, wherein the controller is configured to:
   obtain a respiratory rate, a heart rate, and point cloud information of the object based on the motion information; and determine whether the object is moving based on the obtained information.

4. The object detection apparatus of claim 3, wherein the point cloud information includes x, y, and z coordinate information of points constituting the object.

5. The object detection apparatus of claim 1 wherein the controller is configured to:
   determine that a car seat is detected based on the car seat detection flag; and
   determine that a human is detected in the rear seat based on a cluster size of the motion information exceeding a predetermined value.

6. The object detection apparatus of claim 1, wherein the controller is configured to determine whether a human is detected based on the human detection flag when it is determined that no car seat is detected based on the car seat detection flag.

7. The object detection apparatus of claim 6, wherein the first controller is configured to determine whether an age of the human is smaller than a predetermined value based on the human age information when it is determined that the human is detected based on the human detection flag.

8. The object detection apparatus of claim 7, wherein the controller is configured to determine that a human is detected in the rear seat based on the age of the human being smaller than the predetermined value and a cluster size of the motion information exceeding a predetermined value.

9. The object detection apparatus of claim 1, wherein the controller is configured to output the warning notifying that a human is detected in the rear seat of the vehicle through a sound of a horn or by turning on a turn signal of the vehicle based on the object in the rear seat being the human.

10. The method of claim 1, wherein the determining of whether the object in the rear seat of the vehicle is a human comprises determining whether the human is detected based on the human detection flag when it is determined that no car seat is detected based on the car seat detection flag.

11. The method of claim 10, wherein the determining of whether the object in the rear seat of the vehicle is a human comprises determining whether an age of the human is smaller than a predetermined value based on the human age information when it is determined that the human is detected based on the human detection flag.

12. The method of claim 11, wherein the determining of whether the object in the rear seat of the vehicle is a human comprises determining that a human is detected in the rear seat based on the age of the human being smaller than the predetermined value and a cluster size of the motion information exceeding a predetermined value.

13. A method for detecting an object in a vehicle, the method comprising:
   obtaining, by an indoor camera, image data;
   obtaining, by an indoor radar, radar data;
   obtaining, by at least one processor, identification information on the object in a rear seat of the vehicle based on processing the image data;
   obtaining, by the at least one processor, motion information on the object in the rear seat of the vehicle based on processing the radar data;
   determining, by the at least one processor, whether the object in the rear seat of the vehicle is a human based on the identification information on the object in the rear seat of the vehicle and the motion information on the object when the vehicle is turned off and a door is locked; and
   outputting a warning notifying that a human is detected in the rear seat of the vehicle based on determining that the object in the rear seat of the vehicle is the human,
   wherein the obtaining of the identification information comprises
      obtaining the identification information on the object including an object detection flag, a human detection flag, human age information, and a car seat detection flag by processing the image data for the object, and
   wherein the determining of whether the object in the rear seat of the vehicle is a human comprises
      when determining that a car seat is detected based on the car seat detection flag being set to one, the object detection flag being set to zero, and the human detection flag being set to zero, determine that the motion of the objects corresponds to a motion of a baby based on the motion information.

14. The method of claim 13, wherein the obtaining of the motion information comprises obtaining the motion information including a distance, a velocity, and an angle of arrival of the object based on performing digital signal processing on the radar data.

15. The method of claim 13, wherein the obtaining of the motion information comprises:
   obtaining a respiratory rate, a heart rate, and point cloud information of the object based on the motion information; and
   determining whether the object is moving based on the obtained information.

16. The method of claim 15, wherein the point cloud information includes x, y, and z coordinate information of points constituting the object.

17. The method of claim 13, wherein the determining of whether the object in the rear seat of the vehicle is a human comprises:
   determining whether a car seat is detected based on the car seat detection flag;
   determining whether a cluster size of the motion information exceeds a predetermined value based on detection of the car seat being determined; and
   determining that a human is detected in the rear seat based on the cluster size exceeding the predetermined value.

18. The method of claim 13, wherein the outputting of the warning notifying that a human is detected in the rear seat of the vehicle comprises outputting the warning notifying that there is a human in the rear seat of the vehicle through a sound of a horn or by turning on a turn signal of the vehicle based on the object in the rear seat being the human.

19. An apparatus for detecting an object in a vehicle, the object detection apparatus comprising:
   sensors including an image sensor and a motion sensor inside the vehicle; and
   a controller including a first processor and a second processor, the first processor configured to process image data of the image sensor to obtain identification information on the object in a rear seat of the vehicle, and the second processor configured to process motion data of the motion sensor to obtain motion information on the object in the rear seat of the vehicle,
   wherein the controller is configured to:
      determine whether the object in the rear seat of the vehicle is a human based on the identification information on the object in the rear seat of the vehicle and the motion information on the object when the vehicle is turned off and a door is locked;
      obtain the identification information on the object including an object detection flag, a human detection flag, human age information, and a car seat detection flag by processing the image data for the object;

when determining that a car seat is detected based on the car seat detection flag being set to one, the object detection flag being set to zero, and the human detection flag being set to zero, determine that the motion of the objects corresponds to a motion of a baby based on the motion information; and output a warning notifying that a human is detected in the rear seat of the vehicle based on determining that the object in the rear seat of the vehicle is the human.

20. A method for detecting an object in a vehicle, the method comprising:

obtaining, by an image sensor, image data;

obtaining, by a motion sensor, motion data;

obtaining, by at least one processor, identification information on the object in a rear seat of the vehicle based on processing the image data;

obtaining, by the at least one processor, motion information on the object in the rear seat of the vehicle based on processing the motion data;

determining, by the at least one processor, whether the object in the rear seat of the vehicle is a human based on the identification information on the object in the rear seat of the vehicle and the motion information on the object when the vehicle is turned off and a door is locked; and outputting a warning notifying that a human is detected in the rear seat of the vehicle based on determining that the object in the rear seat of the vehicle is the human, wherein the obtaining of the identification information comprises obtaining the identification information on the object including an object detection flag, a human detection flag, human age information, and a car seat detection flag by processing the image data for the object, and wherein the determining of whether the object in the rear seat of the vehicle is a human comprises when determining that a car seat is detected based on the car seat detection flag being set to one, the object detection flag being set to zero, and the human detection flag being set to zero, determine that the motion of the objects corresponds to a motion of a baby based on the motion information.

* * * * *